United States Patent
Sato et al.

(10) Patent No.: US 8,897,919 B2
(45) Date of Patent: Nov. 25, 2014

(54) ROBOT CONTROLLER WHICH CONDUCTS A FORCE CONTROL BY USING A THREE-AXIAL FORCE SENSOR

(75) Inventors: Takashi Sato, Yamanashi (JP); Takahiro Iwatake, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 346 days.

(21) Appl. No.: 13/495,170

(22) Filed: Jun. 13, 2012

(65) Prior Publication Data

US 2013/0338832 A1 Dec. 19, 2013

(51) Int. Cl.
*G05B 15/00* (2006.01)
*G05B 13/00* (2006.01)

(52) U.S. Cl.
USPC .............................................. 700/260; 700/1

(58) Field of Classification Search
CPC .... B25J 9/1689; B25J 9/1633; B62D 57/032; A61B 19/2203; A61B 19/2223
USPC .......................................................... 700/260
See application file for complete search history.

(56) References Cited

U.S. PATENT DOCUMENTS 5,497,061 A * 3/1996 Nonaka et al. ........... 318/568.11
2013/0338832 A1* 12/2013 Sato et al. ..................... 700/260

FOREIGN PATENT DOCUMENTS

| JP | 4-74942 A | 3/1992 |
| JP | 2010112864 A | 5/2010 |

OTHER PUBLICATIONS

JP Office Action, dated Sep. 18, 2012, issued in JP Application No. 2010-290897.

* cited by examiner

*Primary Examiner* — Ian Jen
(74) *Attorney, Agent, or Firm* — Lowe Hauptman & Ham, LLP

(57) ABSTRACT

A robot controller (11) which moves either a tool (4) or a workpiece (W) relative to another one with a hand unit, controls the force acting between the tool and the workpiece, comprising a force detector unit (3) for detecting a force in one axial direction and moments about the axes in two axial directions that are at right angles with the one axis and are, further, at right angles with each other; a force-presuming point setting unit (12) for setting a force-presuming point at where a force acting between the tool and the workpiece is presumed; and a force-presuming unit (13) for presuming forces in the two axial directions and a moment about the one axis based upon the force in the one axial direction and the moments about the axes in the two axial directions, and upon the position of the force-presuming point.

11 Claims, 12 Drawing Sheets

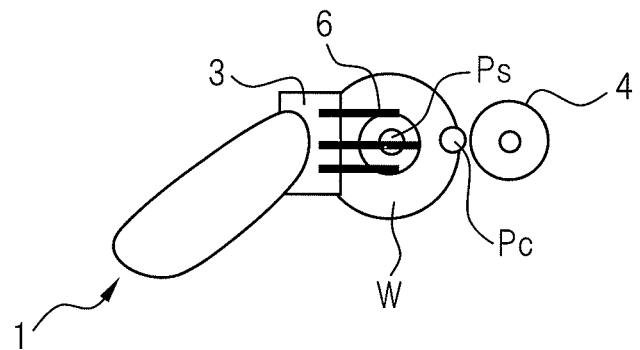
FIG.6A
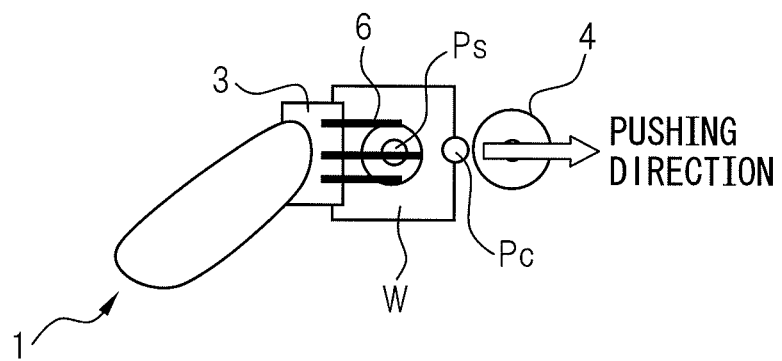
FIG.6B
FIG.7A
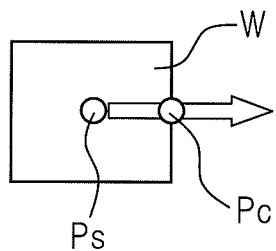
FIG.7B
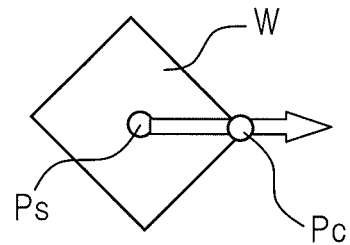
FIG.7C
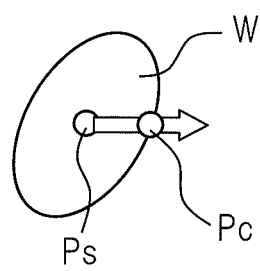
FIG.7D
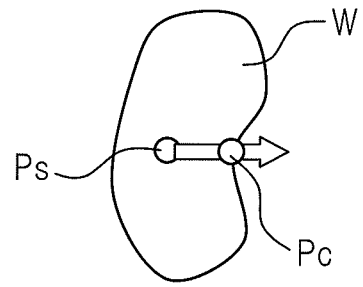

ROBOT CONTROLLER WHICH CONDUCTS A FORCE CONTROL BY USING A THREE-AXIAL FORCE SENSOR

BACKGROUND OF THE INVENTION

1. Field of the Invention

This invention relates to a robot controller of a robot system which conducts force control by using a three-axial force sensor that measures three components consisting of a force in one axial direction and moments about the axes in two axial directions that are at right angles with the above axis and are, further, at right angles with each other.

2. Description of the Related Art

A three-axial force sensor has been known which is capable of measuring three components consisting of a force in one axial direction and moments about the axes in two axial directions that are at right angles with the above axis and are, further, at right angles with each other. As disclosed in Japanese Unexamined Patent Publication No. 2010-112864, the above three-axial force sensor is small, can be inexpensively produced, and is widely used.

The axis in which the force is detected by the three-axial force sensor 3 is presumed to be the Z-axis, and the axes that are at right angles with the above axis and are, further, at right angles with each other are presumed to be X-axis and Y-axis, respectively. Further, the forces acting in the directions of X-axis, Y-axis and Z-axis are denoted by Fx, Fy and Fz, and the moments acting about the X-axis, Y-axis and Z-axis are denoted by Mx, My and Mz, respectively.

Japanese Unexamined Patent Publication No. 2010-112864 discloses a five-axial force sensor which includes a first measuring unit for detecting three components consisting of the force Fz and the moments Mx and My, and a second measuring unit for detecting two components consisting of the forces Fx and Fy. The five-axial force sensor is small and is capable of directly sensing translational forces Fx, Fy and Fz in the directions of a plurality of axes and moments Mx and My about the X- and Y-axes.

However, the five-axial force sensor that includes the second measuring unit for measuring the forces Fx, Fy disclosed in Japanese Unexamined Patent Publication No. 2010-112864, is produced and calibrated requiring a lot of laborious work and time.

Further, the conventional three-axial force sensor for detecting the three components of force Fz and moments Mx, My is capable of executing no more than the force controlling by using these three components, such as controlling the force in the direction of Z-axis, controlling the torque about the X- and Y-axes, or controlling the posture to align the faces about the X- and Y-axes. Therefore, it is difficult to cope with a complex control which requires four or more components.

The present invention was accomplished in view of the above-mentioned circumstances and has an object of providing a robot controller which, despite of using the three-axial force sensor, presumes the forces and moments that could not be detected by the three-axial force sensor in order to control the forces like when a six-axial force sensor is used.

SUMMARY OF THE INVENTION

In order to achieve the above object according to a first aspect, there is provided a robot controller which moves either a tool or a workpiece relative to the other one of them by a hand unit of the robot to control the force acting between the tool and the workpiece, comprising a force detector unit for detecting a force in one axial direction and moments about the axes in two axial directions that are at right angles with the above one axis and are, further, at right angles with each other; a force-presuming point setting unit for setting a force-presuming point at where a force acting between the tool and the workpiece is presumed; and a force-presuming unit for presuming forces in the two axial directions and a moment about the above one axis based upon the force in the above one axial direction and the moments about the axes in the two axial directions detected by the force detector unit, and upon the position of the force-presuming point set by the force-presuming point setting unit.

According to a second aspect as set forth in the first aspect, the force-presuming point setting unit calculates and sets the position of the force-presuming point based upon a relative positional relationship between the tool and the workpiece, upon a position of a reference point for calculating the force-presuming point by which the position of the force-presuming point is calculated, upon a pushing direction between the tool and the workpiece, and upon the data related to the shape of the tool or the shape of the workpiece.

According to a third aspect as set forth in the second aspect, the position of the reference point for calculating the force-presuming point by which the position of the force-presuming point is calculated, is variable, and the position of the force-presuming point is calculated and set based upon the varied position of the reference point for calculating the force-presuming point.

According to a fourth aspect as set forth in the first aspect, the force-presuming point setting unit varies the position of the force-presuming point while the robot is in operation.

According to a fifth aspect as set forth in any one of the first to fourth aspect, provision is further made of a force-presuming point correction unit for correcting the position of the force-presuming point by presuming the amount of wear of the tool.

According to a sixth aspect as set forth in any one of the first, fourth or fifth aspect, the force-presuming point setting unit applies a force to the force-presuming point to calculate and set the position of the force-presuming point based upon the force in the above one axial direction and upon the moments about the axes in the two axial directions.

According to a seventh aspect as set forth in the sixth aspect, the force-presuming point setting unit applies a known force to the force-presuming point to calculate and set the position of the force-presuming point.

According to an eighth aspect as set forth in the sixth aspect, when the force-presuming point is arranged on any one axis of the three axes, the force-presuming point setting unit calculates and sets the position of the force-presuming point by applying a given force in a known direction which is not in parallel with a plane subtended by the two axes other than the axis in which the force can be measured or, when the force-presuming point is arranged on a plane subtended by the axis in which the force can be measured and the axis which is either one of the rest of the two axes, the force-presuming point setting unit calculates and sets the position of the force-presuming point by applying a given force in a known direction which is not in parallel with the above plane and is not, either, in parallel with a plane subtended by the two axes other than the axis in which the force can be measured.

According to a ninth aspect as set forth in any one of the second, third or fifth aspect, provision is further made of a unit for setting a reference point for calculating a force-presuming point, which applies a force to the reference point for calculating the force-presuming point to calculate and set the position of the reference point for calculating the force-presuming point based upon the force in the above one axial direction and upon the moments about the axes in the two axial directions.

According to a tenth aspect as set forth in the ninth aspect, the unit for setting a reference point for calculating the force-presuming point applies a known force to the reference point for calculating the force-presuming point to calculate and set the position of the reference point for calculating the force-presuming point.

According to an eleventh aspect as set forth in the ninth aspect, when the reference point for calculating the force-presuming point is arranged on any one axis of the three axes, the unit for setting a reference point for calculating the force-presuming point calculates and sets the position of the reference point for calculating the force-presuming point by applying a given force in a known direction which is not in parallel with a plane subtended by the two axes other than the axis in which the force can be measured or, when the reference point for calculating the force-presuming point is arranged on a plane subtended by the axis in which the force can be measured and the axis which is either one of the rest of the two axes, the unit for setting a reference point for calculating the force-presuming point calculates and sets the position of the reference point for calculating the force-presuming point by applying a given force in a known direction which is not in parallel with the above plane and is not, either, in parallel with a plane subtended by the two axes other than the axis in which the force can be measured.

The above objects, features, advantages as well as other objects, features and advantages of the invention will become more obvious from the detailed description of typical embodiments of the invention together with the accompanying drawings.

BRIEF DESCRIPTION OF THE DRAWINGS

FIG. 6A is a first enlarged view of an end portion of a robot;

FIG. 6B is a second enlarged view of the end portion of the robot;

FIG. 7A is a first view showing the shape of the workpiece;

FIG. 7B is a second view showing the shape of the workpiece;

FIG. 7C is a third view showing the shape of the workpiece;

FIG. 7D is a forth view showing the shape of the workpiece;

DETAILED DESCRIPTION

Figure 1:
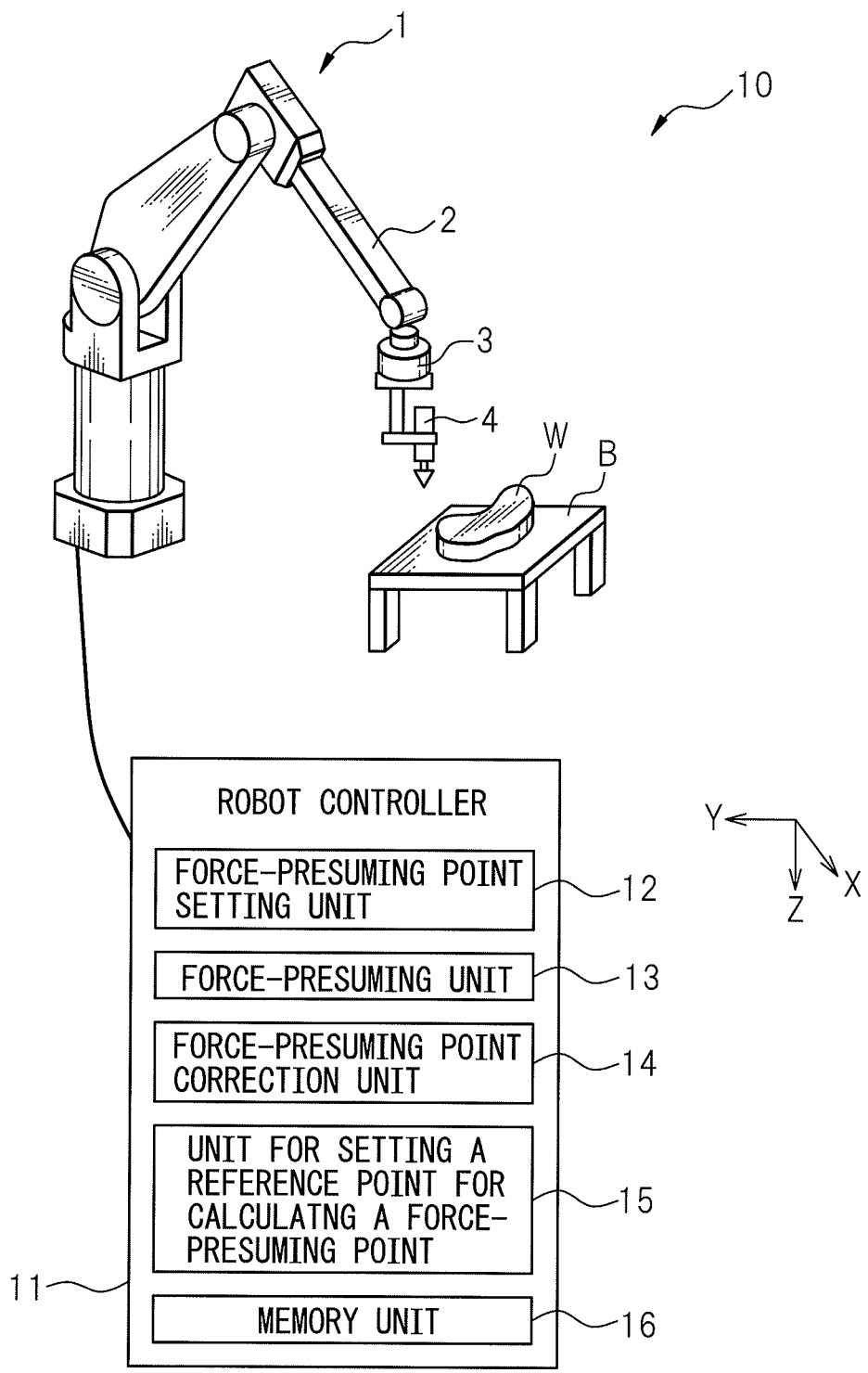
FIG. 1 is a perspective view of a robot system inclusive of a robot controller based on the invention.

Embodiments of the invention will now be described with reference to the accompanying drawings in which the same members are denoted by the same reference numerals. For easy comprehension, the scales of the drawings are arbitrarily varied.

FIG. 1 is a perspective view of a robot system inclusive of a robot controller based on the invention. In the following description as can be seen from FIG. 1, the axis in which the force can be detected is assumed to be Z-axis, and the axes in the two directions that are at right angles with the above axis and are, further, at right angles with each other are assumed to be X-axis and Y-axis, respectively. Further, the forces acting in the directions of the X-axis, Y-axis and Z-axis are denoted by Fx, Fy and Fz, and the moments about the X-axis, Y-axis and Z-axis are denoted by Mx, My and Mz, respectively.

A robot system 10 shown in FIG. 1 includes a robot 1 and a controller 11. The robot 1 is a vertical multi-articulated robot of a six-axis constitution but may be a robot of a type other than the multi-articulated robot of six freedoms. A tool 4 for machining a workpiece W is attached to an end of a robot arm 2 of the robot 1. For convenience, the tool 4 is of a downwardly facing conical shape but may assume any other shape used for the profile work or the machining work.

As shown, a three-axial force sensor 3 (hereinafter referred to as "force sensor") is arranged between the robot arm 2 and the tool 4. The force sensor 3 detects three components consisting of force Fz and moments Mx, My acting on the tool 4. As shown in FIG. 1, further, the workpiece W is placed on a bench B.

The force F and moment M detected by the three-axial force sensor 3 are produced by the force that acts on a body attached to the three-axial force sensor 3 as another body comes in contact therewith and/or by the gravity or inertial force (inclusive of Coriolis force and gyro-effect) that acts on the center of gravity of the body attached to the three-axial force sensor 3.

As shown in FIG. 1, the robot 1 and the force sensor 3 are connected to the robot controller 11 which is a digital computer that controls the positions of axes of the robot 1 of the robot system 10. The data related to the forces and moments detected by the force sensor 3 are input to the robot controller 11. As shown, the robot controller 11 includes a force-presuming point setting unit 12 which sets a force-presuming point for presuming the force acting between the tool 4 and the workpiece W. In this connection, when an external force acts on the three-axial force sensor 3, the force-presuming point is a representative point on where the force presumably acts as another body comes in contact with the three-axial force sensor 3 in addition to being affected by the above-mentioned gravity and inertial force.

Further, the robot controller 11 includes a force-presuming unit 13 which presumes the forces Fx, Fy as well as the moment Mz based upon the force Fz and moments Mx, My detected by the force sensor 3 and upon the position of the force-presuming point presumed by the force-presuming point setting unit 12. Either the force Fx or the force Fy may only be presumed if it is necessary.

Further, the robot controller 11 includes a force-presuming point correction unit 14 for correcting the position of the force-presuming point by presuming the amount of wear of the tool 4, and a unit 15 for setting a reference point for calculating the force-presuming point to calculate and set the position of the reference point for calculating the force-presuming point to thereby calculate the position of the force-presuming point. It is presumed that the data necessary for embodying the invention, such as instruction data for the robot 1 and data related to the masses and centers of gravity of the tool and workpiece, have been stored in the memory unit 16.

Described below with reference to FIG. 1 is a case where the tool 4 attached to the robot 1 traces the workpiece W. The present invention encompasses those cases, too, where the tool 4 attached to an end portion of the robot arm 2 moves relative to the workpiece W and where a hand (not shown in FIG. 1) attached to the end portion of the robot arm 2 and gripping the workpiece W moves relative to the machining tool at a fixed position. The force sensor 3 does not necessarily have to be attached to the robot 1 but may be fixed to the bench B. Further, the bench B may be a movable device such as another robot, and the workpiece or the tool placed thereon may be moved.

In other words, the present invention may be of a constitution in which the force sensor 3 is attached to the robot 1 which is equipped with the tool 4, or the robot 1 grips the workpiece W. Further, the invention may be so constituted that the force sensor 3 is attached or fixed to the bench B, and the robot 1 is equipped with the tool 4 or grips the workpiece. Further, the bench B may be a device that is movable. In the numerical formulas in the following description, "." represents an inner product of vector, "x" an outer product, and "*" a multiplication.

Figure 2A:
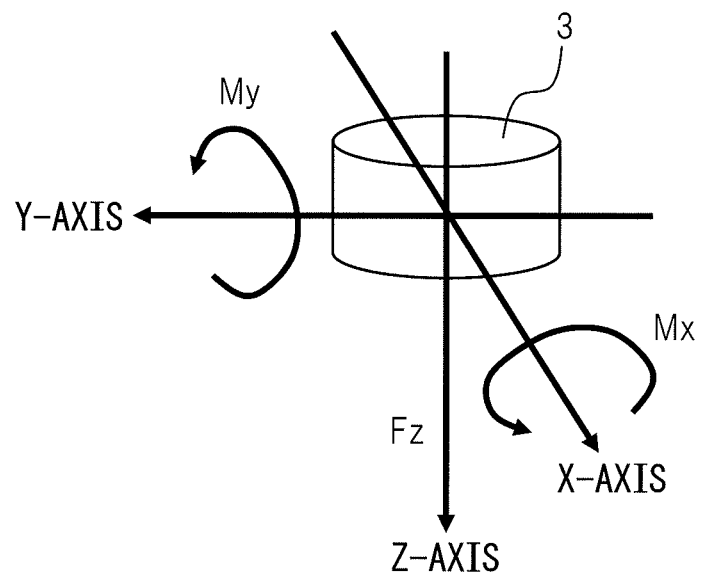
FIG. 2A is a view illustrating the components detected by a three-axial force sensor.
Figure 2B:
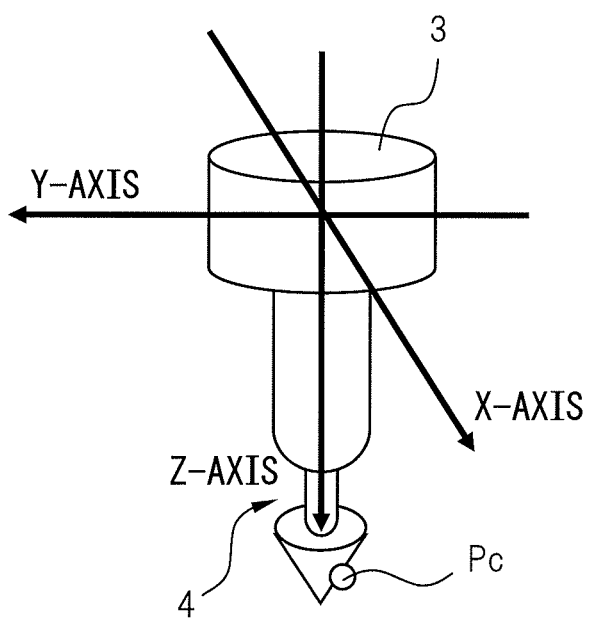
FIG. 2B is a view illustrating a force-presuming point.

FIG. 2A is a view illustrating the components detected by the three-axial force sensor. According to a first embodiment of the invention as shown in FIG. 2A, the force is controlled by using the three components consisting of the force Fz and the moments Mx, My detected by the three-axial force sensor 3. FIG. 2B is a view illustrating a force-presuming point. In the invention, the forces Fx, Fy and/or the moment Mz are presumed based upon the force Fz, moments Mx, My and the position of the force-presuming point Pc (shown in FIG. 2B) relative to the three-axial force sensor. As required, further, the gravity and the inertial force are compensated based upon the above values, and the net force acting on the force-presuming point is presumed to conduct a force control by the robot.

Therefore, by using the three-axial force sensor 3 capable of detecting the three components consisting of the force Fz and the moments Mx, My, the first embodiment makes it possible to conduct the force control in any direction like that of when there is used a six-axial force sensor capable of detecting the forces and moments in six directions. If the force control is conducted in only the translational direction, the forces Fx and Fy only may be presumed. If none of the forces or moments needs to be presumed, then the necessary component only may be presumed.

The three-axial force sensor 3 for detecting the three components of force Fz and moments Mx, My is, generally, simple in construction as compared to multi-axial force sensors of the same rating capable of detecting four or more axes, and can be simply assembled suppressing labor and time of production and suppressing the cost. Therefore, the cost of the robot system can be suppressed if the three-axial force sensor is used for controlling the force instead of using the multi-axial sensor of the same rating which detects for or more axes. In addition, the three-axial force sensor 3 can be produced in a small size enabling the robot system to be fabricated in a smaller size than when the conventional force sensor capable of detecting six axial directions is used.

Referring to FIG. 2B, the coordinate system of the three-axial force sensor fixed to the three-axial force sensor 3 is called force sensor coordinate system. The position of the force-presuming point Pc as viewed from the force sensor coordinate system is set to be Re (rx, ry, rz).

Figure 3:
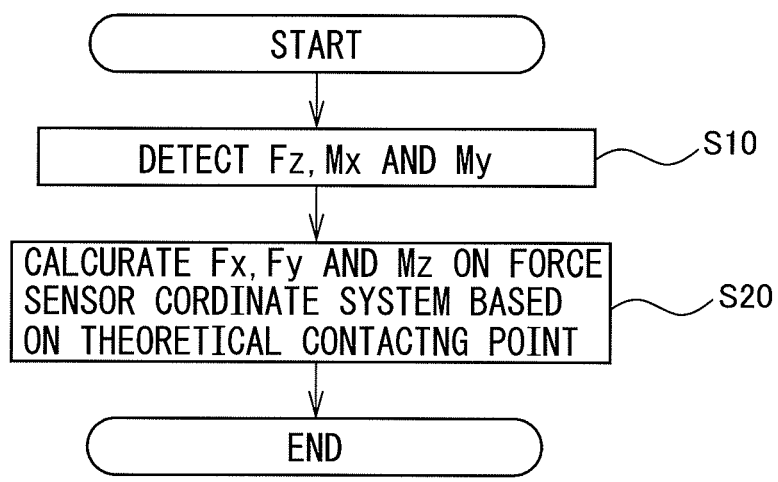
FIG. 3 is a flowchart illustrating the operation of the robot controller based on the invention.

FIG. 3 is a flowchart illustrating the operation of the robot controller based on the invention. First, at step S10, the three-axial force sensor 3 detects the force Fz and moments Mx, My. Then, at step S20, the forces Fx, Fy and the moment Mz are calculated in a manner as described below.

Relationships among the force Fz and moments Mx, My detected by the three-axial force sensor 3, the force-presuming point Pc, and the forces Fx, Fy presumed to be acting on the force-presuming point Pc, are expressed by the following formulas (1) and (2), if the effects by the gravity and by the operation of the hand of the robot are neglected.

$$Mx=Fz*ry-Fy*rz \qquad (1)$$

$$My=-Fz*rx+Fx*rz \qquad (2)$$

Therefore, the forces Fx and Fy are expressed by the following formulas (3) and (4).

$$Fy=(-Mx+Fz*ry)/rz \qquad (3)$$

$$Fx=(My+Fz*rx)/rz \qquad (4)$$

From the thus calculated forces Fx and Fy, the moment Mz is presumed as expressed by the following formula (5). These calculations are executed by the force-presuming unit 13.

$$Mz=Fy*rx-Fx*ry \qquad (5)$$

If the three-axial force sensor 3 is attached to the hand of the robot, the tool 4 is attached to the three-axial force sensor 3 or the workpiece W is gripped by the three-axial force sensor 3, and the hand unit of the robot is moved, then the force detected by the three-axial force sensor 3 includes dynamic terms such as centrifugal force generated as the end effector at an end of the robot arm moves together with the robot arm and inertial force such as Coriolis force. Described below is how the force-presuming unit 13 presumes the forces Fx, Fy and moment Mz by taking the effects of gravity and dynamic terms into consideration.

The gravity and dynamic terms can be calculated by a known method, for example, by a method disclosed in Japanese Patent No. 4267027. Concretely, a dynamic equation of a manipulator is solved relying on the Newton-Euler's method or the Lagrange's method, and the forces acting on the center of the coordinate system of the three-axial force sensor are found, which comprise the gravity and the inertial force acting on the center of gravity of the tool attached to the three-axial force sensor as viewed from the coordinate system of the three-axial force sensor, based upon the articulate angular vector θ of the robot arm, upon the velocity and upon the acceleration of the articulate angular vector θ. Thus, the gravity and the dynamic terms acting on the three-axial force sensor as viewed from the coordinate system of the three-axial force sensor can be calculated by the force-presuming unit 13.

Concretely described below is a method by which the force-presuming unit 13 presumes the forces Fx, Fy and moment Mz by taking into consideration the gravity and the dynamic terms found as described above. The force vector produced by the tool 4 or the workpiece W attached to the three-axial force sensor 3 at the hand of the robot due to the gravity and the motion of the hand unit of the robot, is denoted by Fm as viewed from the coordinate system of the three-axial force sensor. Further, the vectors consisting of the detected moments Mx, My and the presumed moment Mz are denoted by Mm (Mx, My, Mz). Further, the vectors consisting of the presumed forces Fx, Fy and the detected force Fz are denoted by Fr (Fx, Fy, Fz). The position of the center of gravity of the tool 4 or the workpiece W attached to the three-axial force sensor 3 at the hand of the robot is denoted by Cg (cx, cy, cz) in the coordinate system of the force sensor. The position Cg has been found in advance.

In this case, there is obtained a relationship represented by the following formula (6).

$$Mm = Re \times Fr + Cg \times Fm \quad (6)$$

As described above, Re is the position of the force-presuming point Pc. By using this formula (6), the force-presuming unit 13 can calculate the forces Fx, Fy and moment Mz by taking the effects of gravity and dynamic terms into consideration.

The position Re of the force-presuming point Pc is set by the force-presuming point setting unit 12. The position Re of the force-presuming point Pc is a position where the position of the robot given on a reference coordinate system is expressed on the force sensor coordinate system, or is a position where the position given to the hand unit of the robot is expressed on the force sensor coordinate system. Alternatively, the position Re expressed by these respective positions may be fixed or variable.

Further, the force-presuming point setting unit 12 may set an estimated position near the contacting point or may set a position such as of TCP (tool center point) as the position Re of the force-presuming point Pc. Alternatively, a position that has been measured in advance or a position measured during the operation may be set as the position Re of the force-presuming point Pc.

In order to set the position Re of the force-presuming point Pc, an instruction operation may be set to the robot so as to attain a known position. In addition, the position Re of the force-presuming point Pc may be set from the images obtained by using a camera that is capable of taking images after every predetermined interval while the robot is in operation. Alternatively, the position Re of the force-presuming point Pc may be set by the force-presuming point setting unit 12 by moving a contact sensor capable of discerning a contacting portion, obtaining in advance the contacting position of during the operation, and by utilizing the data thereof.

The forces Fx, Fy and moment Mz can be accurately presumed even when the three-axial force sensor 3 is attached to the hand of the robot, the hand 6 for gripping the workpiece W or the tool 4 is attached thereto and the hand unit of the robot is moved according to the above method.

In the second to fifth embodiments of the invention, the position Re of the force-presuming point Pc relative to the three-axial force sensor 3 is more precisely presumed in order to heighten the accuracy for presuming the forces Fx, Fy and moment Mz.

In the invention, the forces and moments in the directions that are not detected by the three-axial force sensor 3 are presumed by using the force-presuming point Pc. Therefore, it is desired to more precisely set the force-presuming point Pc. Accordingly, use of the following method is very effective in precisely presuming the forces Fx, Fy and moment Mz.

The force-presuming point Pc is a representative point on where the force presumably acts as another body comes in contact with the tool or the workpiece attached to the three-axial force sensor 3. Therefore, upon more precisely setting the force-presuming point Pc, the forces Fx, Fy and moment Mz can be more precisely presumed.

In the second embodiment, in case the contacting point between the tool 4 and the workpiece W varies and the position of the contacting point varies relative to the three-axial force sensor 3, the position Re of the force-presuming point Pc is calculated based on a geometrical relationship by using a point that serves as a reference (reference point for calculating the force-presuming point).

Concretely, in the second embodiment, the position of the force-presuming point Pc is calculated relative to the three-axial force sensor 3 by using a relative positional relationship between the tool 4 and the workpiece W, using "a reference point for calculating the force-presuming point" that is used for calculating the position of the force-presuming point Pc relative to the three-axial force sensor 3, using the pushing direction, and using the data related to the shape of the tool 4 or the workpiece W.

This will now be described. The reference point Ps for calculating the force-presuming point is a given point suited for calculating the force-presuming point Pc, and is set by a unit 15 for setting the reference point for calculating the force-presuming point. In case the position of the contacting point varies relative to the three-axial force sensor 3, the reference point Ps for calculating the force-presuming point is desirably set to a point located at the center thereof or is set to a point suited for the calculation. The reference point Ps for calculating the force-presuming point may be set to the same position as the initial position of the force-presuming point Pc, and may be corrected relative to that point.

Figure 4A:
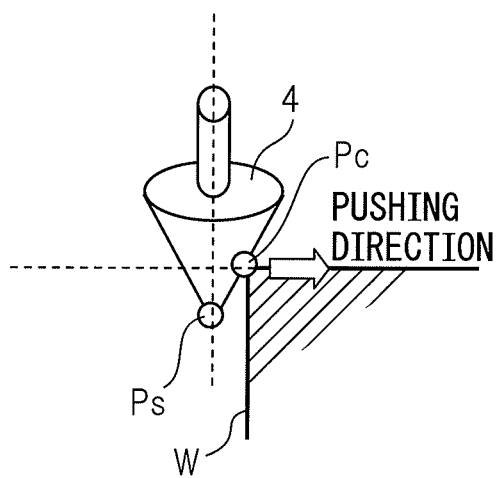
FIG. 4A is a schematic side view of a tool that comes in contact with a workpiece.
Figure 4B:
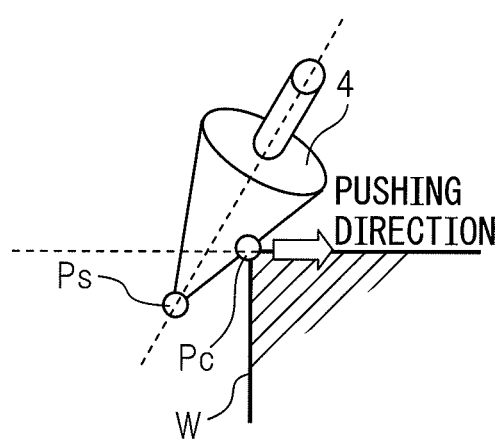
FIG. 4B is another schematic side view of the tool that comes in contact with the workpiece.
Figure 4C:
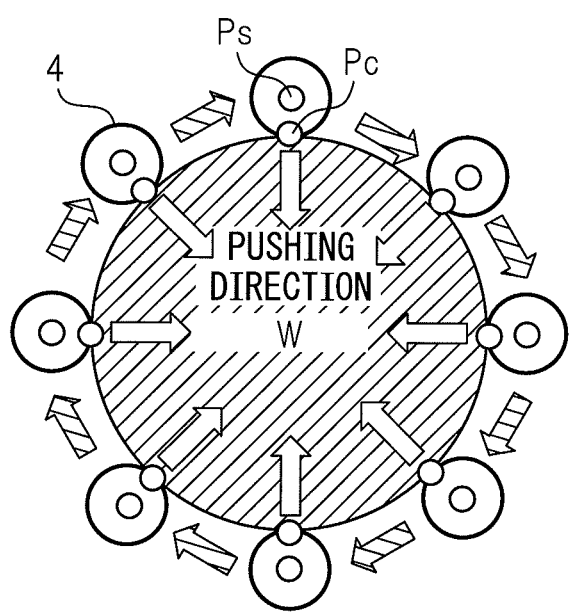
FIG. 4C is a schematic top view of the tool that comes in contact with the workpiece.

FIGS. 4A and 4B are schematic side views of the tool that comes in contact with the workpiece, and FIG. 4C is a schematic top view of the tool that comes in contact with the workpiece. One method of calculating the force-presuming point Pc will now be described with reference to these drawings. In this case, the reference point Ps for calculating the force-presuming point is set on part of the center line of the tool 4 of a conical shape, e.g., set at an end of the tool 4.

As shown in FIGS. 4A and 4C, the tool 4 is tracing the circumference of the workpiece W. In other words, in FIGS. 4A and 4C, the position of the tool 4 and the pushing direction represented by an arrow are varied and, at the same time, the tool 4 is moving while varying the contacting position on the tool 4. In such a case, the force-presuming point Pc is presumed at a position closer to the real contacting point so as to more precisely presume the forces Fx, Fy and moment Mz.

The position of the force-presuming point Pc is denoted by Re, the position of the reference point Ps for calculating the force-presuming point is denoted by Rb, and the vector from the reference point Ps for calculating the force-presuming point to the force-presuming point Pc is denoted by Rr. The vector Rr is found from the geometrical relationship for every control period of the robot 1. The force-presuming point setting unit 12 finds the position Re of the force-presuming point Pc according to the following formula (7).

$$Re = Rb + Rr \quad (7)$$

When the tool 4 is tilted relative to the workpiece W and is moved varying the contacting position on the tool 4 as shown in FIG. 4B, too, the forces Fx, Fy and moment Mz can be more precisely presumed by the calculation based on the reference point Ps for calculating the force-presuming point and on the positional relationship between the reference point Ps for calculating the force-presuming point and the force-presuming point Pc in the same manner as described above.

Figure 5A:
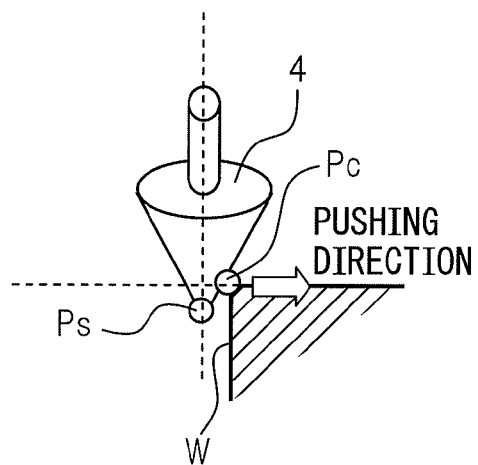
FIG. 5A is a first schematic side view of the tool that comes in contact with the workpiece.
Figure 5B:
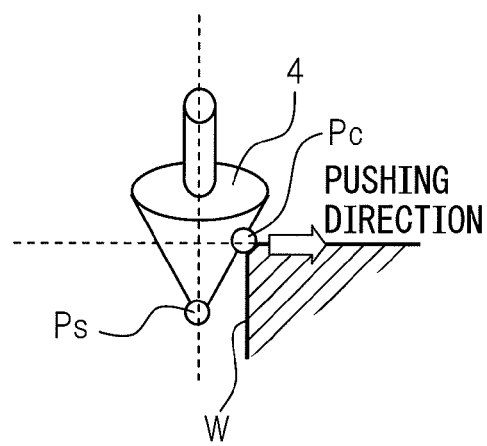
FIG. 5B is a second schematic side view of the tool that comes in contact with the workpiece.
Figure 5C:
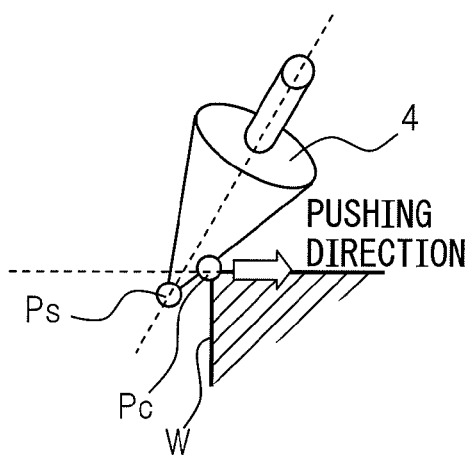
FIG. 5C is a third schematic side view of the tool that comes in contact with the workpiece.
Figure 5D:
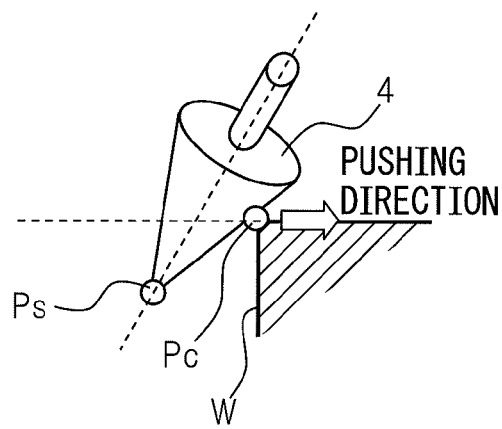
FIG. 5D is a forth schematic side view of the tool that comes in contact with the workpiece.

FIGS. 5A to 5D are schematic side views of the tool that comes in contact with the workpiece. In this case as can be seen from FIGS. 5A and 5B, the relative positional relationship between the tool 4 and the workpiece W is varying toward the upper direction. Similarly, when the tool 4 is tilted relative to the workpiece W as shown in FIGS. 5C and 5D, too, the relative positional relationship between the tool 4 and the workpiece W is varying toward the upper direction. When the relative positional relationship between the tool 4 and the workpiece W varies, too, the forces Fx, Fy and moment Mz can be more precisely presumed by using the formula (7).

FIGS. 6A and 6B are enlarged views of an end portion of the robot. In these drawings, the three-axial force sensor 3 is attached to the hand unit of the robot. A hand 6 is attached to an end farther than the three-axial force sensor 3, and is gripping the workpiece W. On the contrary, the tool 4 is fixed to a separate place.

In FIG. 6A in this state, the machining is conducted while changing the portion to be machined of the workpiece W. The workpiece W shown in FIG. 6A is of a circular shape in cross section. When the workpiece W has a relatively simple shape as above, the distance remains constant between a place where the machining is to be conducted (nearly the same as the force-presuming point Pc) and the reference point Ps for calculating the force-presuming point (center of the workpiece W in this case). In this case, the forces Fx, Fy and moment Mz can be more precisely presumed by the method the same as the one described above.

On the contrary, the workpiece W shown in FIG. 6B is of a rectangular shape in cross section, and the distance is not constant between a place where the machining is to be conducted (nearly the same as the force-presuming point Pc) and the reference point Ps for calculating the force-presuming point (center of the workpiece W). FIGS. 7A to 7D are examples of when the workpiece W to be gripped has a relatively complex shape, the distance is not constant between the reference point Ps for calculating the force-presuming point and the portion that is to be machined when the robot is in operation, and the portion to be machined is present in the pushing direction from the reference point Ps for calculating the force-presuming point.

In this case, the data related to the shape of a portion to be machined of the workpiece W are obtained in advance, and the data related to the shape of the portion to be machined of the workpiece W relative to the force sensor coordinate system of the three-axial force sensor 3 are calculated from the gripping position and posture of when the workpiece W is gripped by the hand 6. The force-presuming point Pc is then calculated based on the position of the reference point Ps for calculating the force-presuming point (e.g., center of the workpiece W), pushing direction and data related to the shape of the portion to be machined of the workpiece W relative to the three-axial force sensor.

Figure 8:
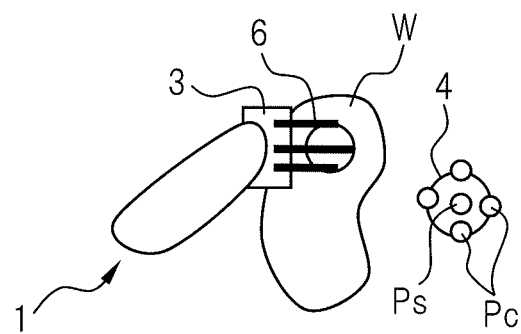
FIG. 8 is another enlarged view of the end portion of the robot.

FIG. 8 is another enlarged view of the end portion of the robot. As shown in FIG. 8, when the three-axial force sensor 3 is provided on the side of the robot 1 and the workpiece W gripped by the hand 6 is acted onto the fixed tool 4, the position Re of the force-presuming point Pc relative to the three-axial force sensor 3 can be calculated according to a method described below.

First, the force-presuming point Pc is set by the force-presuming point setting unit 12 on the outer circumferential portion of the tool 4 that is fixed. As shown in FIG. 8, the position of the force-presuming point Pc may vary while the robot 1 is in operation. The reference point Ps for calculating the force-presuming point is located at the center of the tool 4.

Then, the operation of the robot 1 is so instructed that the tool 4 and the workpiece W come in contact with each other at the force-presuming point Pc as much as possible. Parameters for instructing such an operation of the robot may include the orbit and velocity of the robot 1, pushing direction and target pushing force.

Figure 9A:
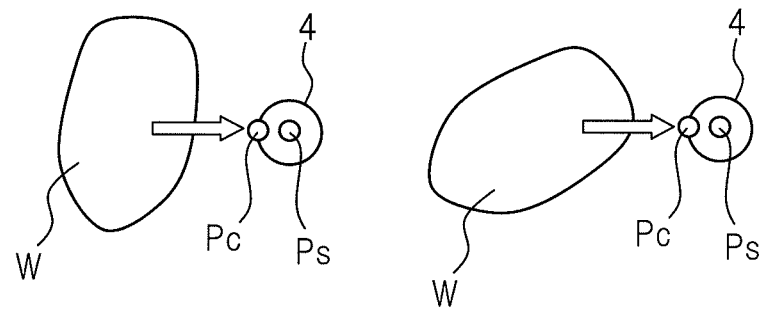
FIG. 9A is a top view of the workpiece.
Figure 9B:
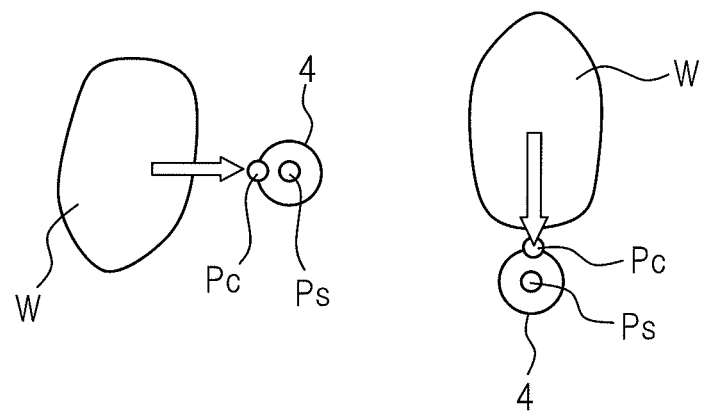
FIG. 9B is another top view of the workpiece.
Figure 10A:
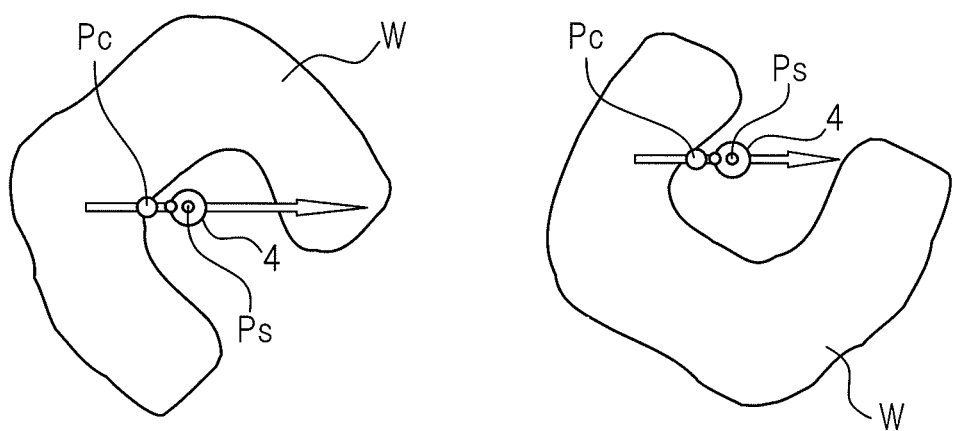
FIG. 10A is a top view of another workpiece.
Figure 10B:
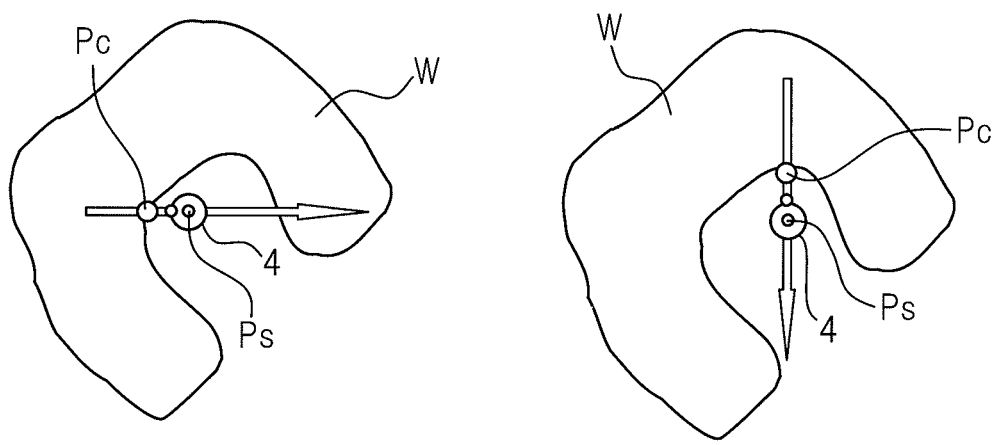
FIG. 10B is another top view of the another workpiece.

In bringing the workpiece gripped by the robot 1 in contact with the fixed tool, FIGS. 9A and 10A illustrate a case where the position of the force-presuming point Pc does not change relative to the tool 4 while FIGS. 9B and 10B illustrate a case where the position of the force-presuming point Pc changes relative to the tool 4 and the pushing direction changes, too. Thus, even when the workpiece has a complex shape and the position of the force-presuming point Pc varies dynamically and in a complicated manner relative to the three-axial force sensor 3 due to the motion of the robot 1, it is possible to easily find the position of the force-presuming point Pc relative to the three-axial force sensor 3 based upon the position of the force-presuming point Pc relative to the reference coordinate system of the robot without using data related to the shape of a portion to be machined of the workpiece W.

In instructing the operation of the robot 1, when the reference point Ps for calculating the force-presuming point is to be used, the reference point Ps for calculating the force-presuming point is set and relative positions (direction, distance, etc.) of the force-presuming point Pc and the reference point Ps for calculating the force-presuming point are set (second and third embodiments). In instructing the operation of the robot 1, further, when the force-presuming point Pc is directly used without using the reference point Ps for calculating the force-presuming point, the position of the force-presuming point Pc is directly and dynamically set and updated (fourth embodiment). Thus, the operation of the robot 1 is corresponded to the force-presuming point Pc relative to the robot 1.

When the robot 1 is in motion, the force-presuming unit 13 calculates the position of the force-presuming point Pc relative to the three-axial force sensor 3 based on the position and posture of the robot. In this connection, a matrix representing the position•posture relationship between the reference coordinate system of the robot 1 and the force sensor coordinate system of the three-axial force sensor 3, is denoted by Trf, and a matrix representing the position•posture relationship between the reference coordinate system of the robot and the force-presuming point Pc is denoted by Tre. Then the position of the force-presuming point Pc relative to the three-axial force sensor 3 is found from a relationship between Trf and Tre. This is obvious for people skilled in the art.

In this case, though the positional relationship between the force-presuming point Pc and the tool 4 fixed to the bench B can be relatively easily expressed, the positional relationship between the force-presuming point Pc and the three-axial force sensor 3 varies in a complicated manner and dynamically depending upon the shape of the workpiece W and the posture of the hand unit of the robot 1. The position of the force-presuming point Pc can be dynamically varied based on the positional relationship between the force-presuming point Pc on the tool 4 and the robot 1 by updating, at all times, the position of the force-presuming point Pc relative to the three-axial force sensor 3.

The above method makes it possible to easily calculate the force-presuming point Pc even when the workpiece W has a complex shape and the position of the force-presuming point Pc varies dynamically and in a complicated manner relative to the three-axial force sensor 3. By using the reference point Ps for calculating the force-presuming point, further, the position of the force-presuming point Pc can be expressed as relative positional relationship and, therefore, the position of the force-presuming point Pc can be expressed more easily.

Thus, the force-presuming point Pc or the reference point Ps for calculating the force-presuming point is set to the tool 4 or to the hand unit of the robot 1 such as the hand 6, or is set to the reference coordinate system of the robot 1. Upon so instructing that the force-presuming point Pc can be found from a geometrical relationship, it is allowed to accurately calculate the forces and moments, such as forces Fx, Fy and moment Fz that cannot be detected by the three-axial force sensor 3.

In a third embodiment, it is desired to suitably vary, during the operation, too, the reference point that is used for finding the force-presuming point Pc. In other words, the force-presuming point correction unit 14 varies the position of the reference point Ps for calculating the force-presuming point relative to the three-axial force sensor 3 based upon the input from the instruction operation board or the keyboard, upon the operation program of the robot 1, or upon a predetermined setting such as change-over depending on the operation of the robot 1. Therefore, even when a different tool 4 is used or when the contacting portion is varied on the tool 4, the deviation in position of the contact-presuming point can be corrected.

Figure 11A:
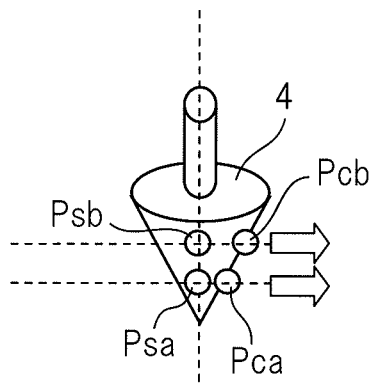
FIG. 11A is another schematic side view of the tool that comes in contact with the workpiece.
Figure 11B:
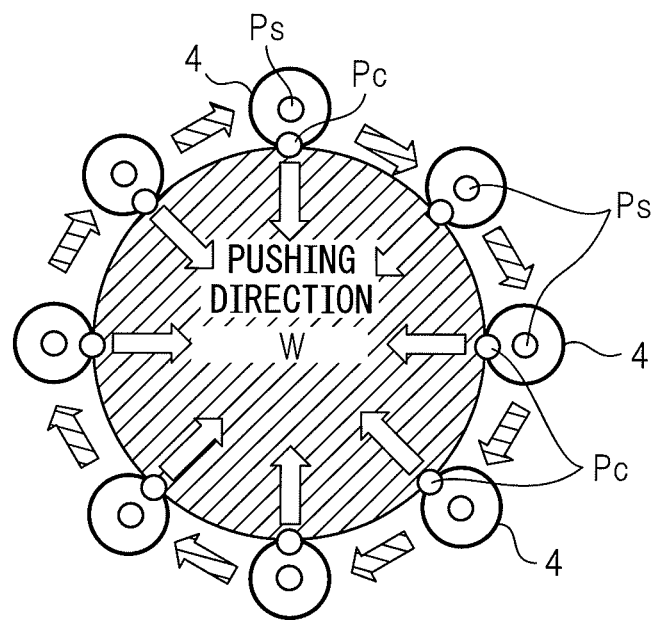
FIG. 11B is a schematic top view of the tool that comes in contact with the workpiece.

FIG. 11A is another schematic side view of the tool that comes in contact with the workpiece, and FIG. 11B is a schematic top view of the tool that comes in contact with the workpiece. As can be seen from FIGS. 11A and 11B, when the robot is in operation, the position of the tool 4 and the pushing direction are changed, and the contacting position on the tool 4 is varied. In this case, the position of the force-presuming point Pc, too, should be varied relative to the three-axial force sensor 3. Further, as can be seen from FIG. 11A, if the height of the tool 4 varies relative to the workpiece W, the force-presuming point Pc should be changed (from Pca to Pcb).

When the tool 4 is in contact with the workpiece on the circumference of the tool at a lower position of the tool 4 which is the position of the reference point Psa for calculating the force-presuming point in the axial direction of the tool, the force-presuming point Pca is calculated based on the reference point Psa for calculating the force-presuming point and on the radius Ra of the tool at that portion. Further, when tool is in contact with the workpiece on the circumference of the tool at an upper position of the tool 4 which is the position of the reference point Psb for calculating the force-presuming point in the axial direction of the tool, the force-presuming point Pcb is calculated based on the reference point Psb for calculating the force-presuming point and on the radius Rb of the tool at that portion. Thus, the contacting point can be presumed more precisely by using a reference point for calculating the force-presuming point at a different position. Further, by presuming the force-presuming point Pc at a position closer to the real contacting point, the force can be presumed more precisely.

Figure 12A:
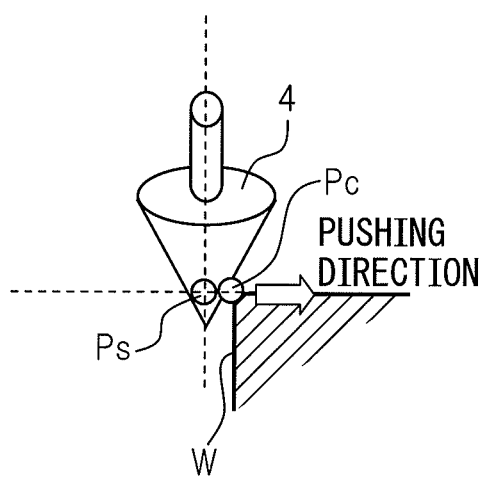
FIG. 12A is a first schematic side view of the tool that comes in contact with the workpiece.
Figure 12B:
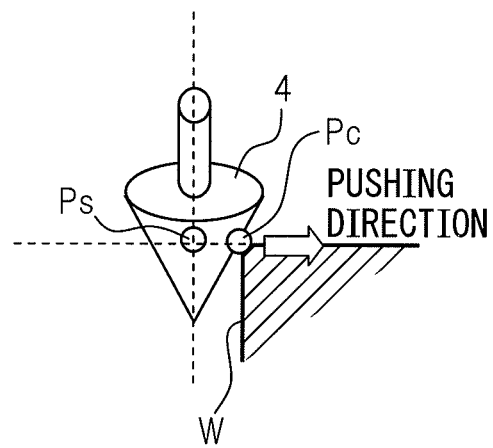
FIG. 12B is a second schematic side view of the tool that comes in contact with the workpiece.
Figure 12C:
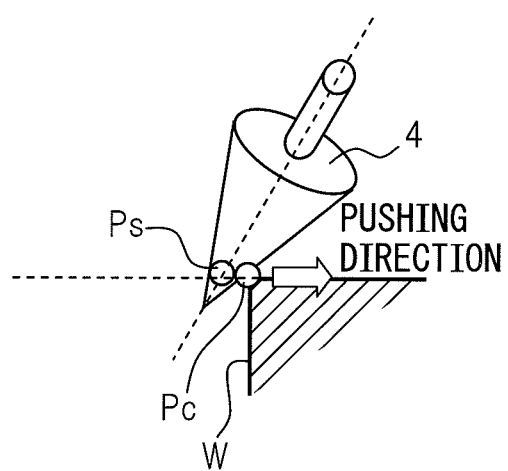
FIG. 12C is a third schematic side view of the tool that comes in contact with the workpiece.
Figure 12D:
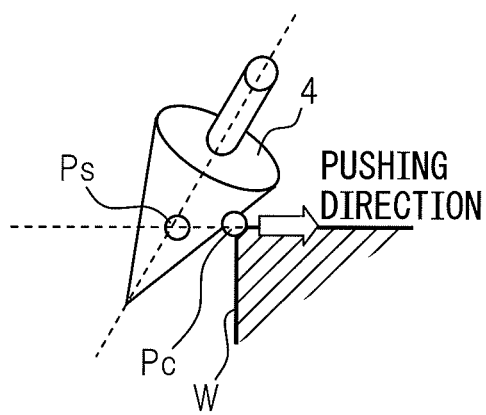
FIG. 12D is a forth schematic side view of the tool that comes in contact with the workpiece.

FIGS. 12A to 12D are schematic side views of the tool that comes in contact with the workpiece. In these drawings, the contacting portion on the tool 4 is varied depending upon the position on the workpiece W. In this case the same also holds as the method shown in FIG. 11. In other words, the force-presuming point Pc is presumed by using a reference point for calculating the force-presuming point at a different position depending upon if a portion contacting to the workpiece is at a lower position of the tool 4 (FIGS. 12A and 12C) or if a portion contacting to the workpiece is an upper position of the tool 4 (FIGS. 12B and 12D). By suitably varying the value of the reference point Ps for calculating the force-presuming point as described above, it is allowed to more precisely presume the contacting point from the pushing direction and the data related to the distance up to the force-presuming point Pc.

Figure 13A:
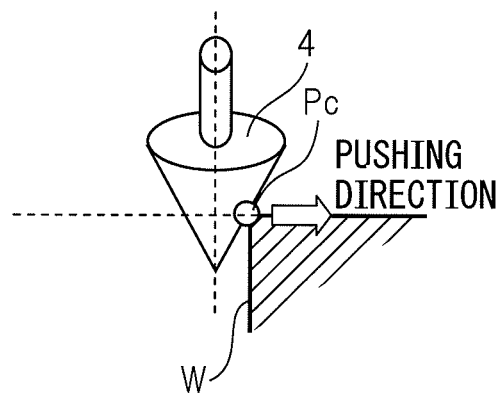
FIG. 13A is a further schematic side view of the tool that comes in contact with the workpiece.
Figure 13B:
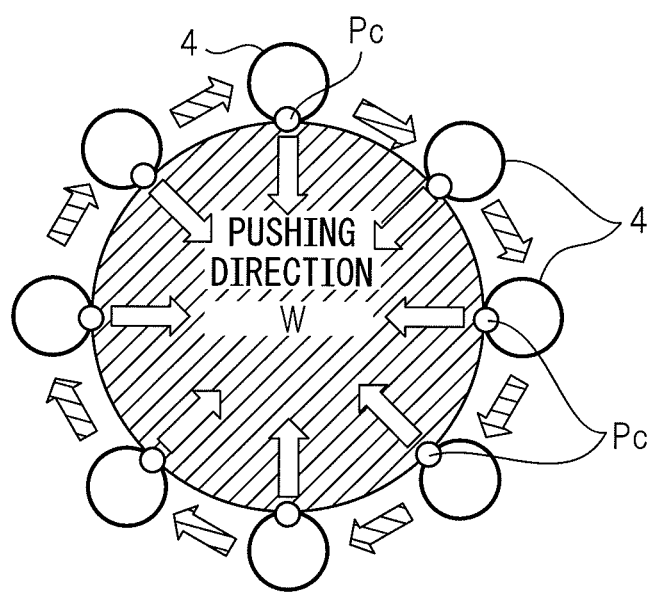
FIG. 13B is a schematic top view of the tool that comes in contact with the workpiece.

FIG. 13A is a further schematic side view of the tool that comes in contact with the workpiece, and FIG. 13B is a schematic top view of the tool that comes in contact with the workpiece. In an example shown in FIGS. 13A and 13B, the operation is conducted while varying the position of the tool 4 and the pushing direction, and varying the contacting position on the tool 4.

In such a case according to a fourth embodiment, the force-presuming point Pc is also suitably varied while the robot 1 is in operation. In other words, when the contacting portion between the tool 4 and the workpiece W varies relative to the three-axial force sensor 3, the position of the force-presuming point Pc is updated relative to the three-axial force sensor 3 and is suitably set. Further, by presuming the force-presuming point Pc at a position closer to the real contacting point, the force can be presumed more precisely.

The changing method may be, for example, a change-over into a setpoint value provided in advance, change-over responsive to an input from an instruction operation board or a keyboard, or responsive to an operation program of the robot 1, a force-presuming point Pc provided in advance to meet a positional relationship between the tool 4 and the workpiece W, which is varied depending on the pushing direction, or a force-presuming point Pc provided in advance to meet the traveling direction, which is varied depending upon the traveling direction.

Figure 14:
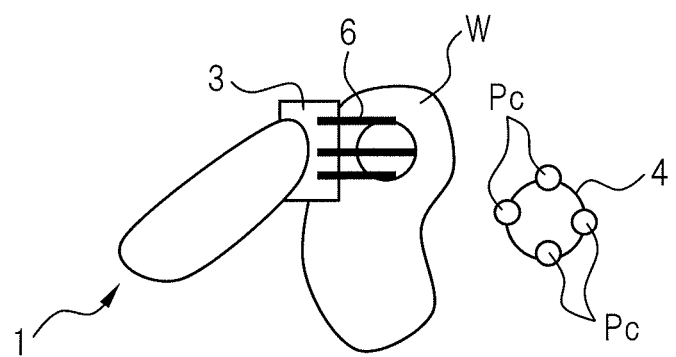
FIG. 14 is a further enlarged view of the end portion of the robot.

FIG. 14 is a further enlarged view of the end portion of the robot. As shown in FIG. 14, the three-axial force sensor 3 is provided on the side of the robot 1, and the workpiece W gripped by the hand 6 of the robot is acted on the fixed tool 4. In this case, if a target contact point set to the tool 4 is regarded as the force-presuming point Pc so as to bring the workpiece into contact with the fixed tool 4, then the position of the force-presuming point Pc dynamically varies relative to the three-axial force sensor 3 as the robot 1 moves.

In such a case, the position of the force-presuming point Pc can be dynamically varied by updating, at all times, the position of the force-presuming point Pc relative to the three-axial force sensor 3 based on a positional relationship between the force-presuming point Pc on the tool 4 and the robot 1. If the portion of contact is to be varied on the fixed tool 4, then the force-presuming point Pc may be updated. The above calculations can be easily conducted by using a transformation matrix that expresses the position and posture.

According to a fifth embodiment, it is desired that the force-presuming point Pc relative to the three-axial force sensor 3 is corrected by the force-presuming point correction unit 14 based on the presumed amount of wear of the tool 4. By presuming the force-presuming point Pc at a position closer to the real contacting point, the force can be presumed more precisely. The three-axial force sensor 3 finds the forces Fx, Fy and moment Mz more precisely based on the presumed amount of wear.

As for a method of presuming the amount of wear, it is desired, for example, to prepare a data table in advance by conducting experiments. The data table may express matters related to the wear of the tool 4, such as materials of the tool 4 and workpiece W, force applied to the tool 4, relative velocity between the tool 4 and the workpiece W, rotational speed of the tool 4, time of execution, etc. The data table prepared in advance is read out from the memory unit 16, and the force-presuming point correction unit 14 presumes the amount of wear of the tool 4 corresponded to the above-mentioned materials, force, etc. Alternatively, a function for calculating the amount of wear is prepared in advance by experiments, and the amount of wear may be presumed based on the function. Thereafter, the force-presuming point correction unit 14 corrects the force-presuming point Pc based on the presumed amount of wear.

In the sixth, seventh, ninth and tenth embodiments, it is desired to presume the force-presuming point Pc or the reference point Ps for calculating the force-presuming point based on a known force. At this moment, the force-presuming point setting unit 12 or the unit 15 for setting the reference point for calculating the force-presuming point, calculates and sets the force-presuming point Pc or the reference point Ps for calculating the force-presuming point based upon the force Fz in one axial direction and upon the moments Mx, My about the axes in two directions that are at right angles with the above axis and are, further, at right angles with each other, that are detected by the three-axial force sensor 3. When a known force is acted, there can be contrived to use a spring device by which a pushing force can be learned depending upon the amount of push, to push the tool onto a fixed measuring instrument capable of measuring the force, or to push the device capable of measuring the force to the part of the tool. Therefore, when a known force is acting, the timing is known from the instruction operation board, the data related to the forces and moments compensating the effect of gravity are obtained from the posture of the robot, and are used for the calculation together with the specified or measured forces. Further, the known force of a desired degree may be found in advance by experiments.

Upon acting the known force as described above, the robot system 10 easily sets the force-presuming point Pc or the reference point Ps for calculating the force-presuming point. Described below is a concrete method.

Figure 15:
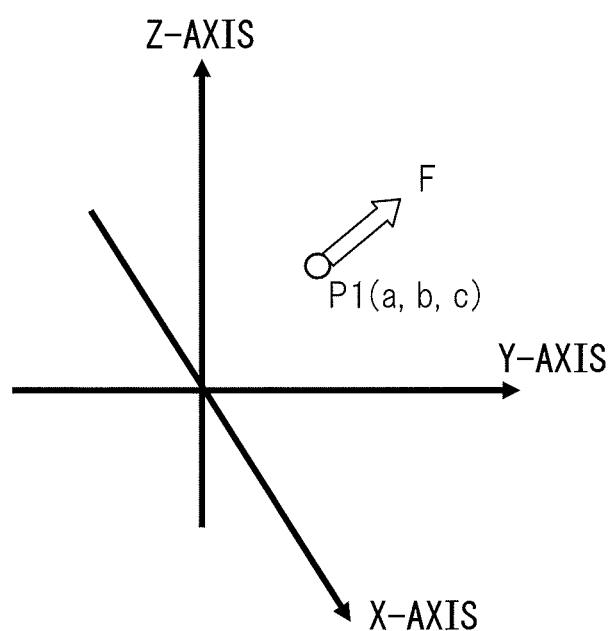
FIG. 15 is a diagram showing a coordinate system of the three-axial force sensor.

FIG. 15 is a diagram showing a coordinate system of the three-axial force sensor. In FIG. 15, when a force F acts on a point P1 in the coordinate system of the three-axial force sensor, the following relationships hold.

$$Mx = b^*Fz - c^*Fy \quad (8)$$

$$My = -a^*Fz + c^*Fx \quad (9)$$

In this case, though the moment Mz cannot be detected, the force Fz and moments Mx, My are detectable.

From these formulas (8) and (9), P1 (a, b, c) can be calculated by applying a known force (e.g., Fz is arbitrary, and (Fx, Fy)=(1, 0), (0, 1) assuming different values) onto a point of which the position is to be found a plurality of times while varying the direction of application and magnitude.

In the sixth, eighth, ninth and eleventh embodiments, the force-presuming point Pc or the reference point Ps for calculating the force-presuming point can be presumed based on a suitable unknown force. In other words, an unknown force of a suitable magnitude is applied onto the force-presuming point Pc or onto the reference point Ps for calculating the force-presuming point, and the force-presuming point Pc or the reference point Ps for calculating the force-presuming point is calculated and set while compensating the effect of gravity based on the force Fz in one axial direction and on the moments Mx, My about the axes in two directions at right angles with the above axis and are, further, at right with each other, that are detected by the three-axial force sensor 3 at that moment. When an unknown force of a suitable magnitude is applied, it is desired to set the timing for applying the force by using the instruction operation board or on condition that a force larger than a given threshold value is applied, and to obtain the forces, moments and posture of the robot at that moment.

Upon applying a suitable force as described above, the robot system 10 easily sets the force-presuming point Pc or the reference point Ps for calculating the force-presuming point.

When the force F is applied on the point P1 in the coordinate system of the three-axial force sensor, the formulas (8) and (9) hold as described with reference to FIG. 15. Therefore, P1 (a, b, c) can be calculated as described above.

When a point of which the position is to be found by these formulas (8) and (9) is arranged on any one axis of the three axes (X-, Y-, Z-axes), the position P1 (a, b, c) of the force-presuming point Pc or the reference point Ps for calculating the force-presuming point, which is a point of application of force, is calculated by applying a force F of a suitable magnitude to that point in a known direction which is not in parallel with a plane subtended by the two axes other than the axis in which the force can be measured, and by finding the forces Fx, Fy from a relationship between a value Fz and the direction in which the force is applied.

In this case, if P1 is present on the Z-axis, the forces Fx and Fy can be learned from the force Fz since the directions a=0, b=0 have been known.

Further, P1 (a, b, c) can be calculated by applying a force of a suitable magnitude to the point of which the position is to be found in a known direction which is not in parallel with a plane subtended by the two axes other than the axis in which the force can be measured a plurality of times in different directions, and by finding the forces Fx, Fy from a relationship between a value Fz, and the direction in which the force is applied.

Similarly, when the point of which the position is to be found is arranged on a plane subtended by the axis in which the force can be measured and another axis, the position P1 (a, b, c) of the force-presuming point Pc or the reference point Ps for calculating the force-presuming point, which is a point of application of force, is calculated by applying a force F of a suitable magnitude to that point in a known direction which is not in parallel with the above plane and is not, either, in parallel with a plane subtended by the two axes other than the axis in which the force can be measured, and by finding the forces Fx, Fy from a relationship between a value Fz and the direction in which the force is applied.

In this case, if P1 is present on the X-Z plane, the forces Fx and Fy can be learned from the value Fz since the direction a=0 has been known. Under this condition, Fx≠0. Therefore, b and c can be found. Therefore, according to the present invention, it is possible that the force-presuming point Pc is easily set by the force-presuming point setting unit 12, and the reference point Ps for calculating the force-presuming point is easily set by the unit 15 for setting the reference point for calculating the force-presuming point.

EFFECTS OF THE INVENTION

According to the present invention, the forces Fx, Fy and/or the moment Mz can be accurately presumed by using the three-axial force sensor which detects three components consisting of the force Fz and the moments Mx, My.

Further, when the forces Fx, Fy and/or the moment Mz are to be presumed by using the three-axial force sensor which detects three components consisting of the force Fz and the moments Mx, My, it is necessary to more precisely presume the contacting point between the tool and the workpiece, which is the point of application of force. To realize a practicable force control by using the three-axial force sensor, the contacting point is easily and more precisely presumed and set relying on the above method. This makes it possible to practicably and more accurately presume the forces Fx, Fy and/or the moment Mz by using the three-axial force sensor, and to utilize the forces Fx, Fy, Fz and the moments Mx, My, Mz for the force control.

The present invention applies the three-axial force sensor that detects the three components of force Fz and moments Mx, My to the robot system that conducts the force control in various directions. The three-axial force sensor is less expensive and smaller in size than the multi-axial force sensors of the same rating that detect four or more axes. Therefore, by substituting the three-axial force sensor for the multi-axial force sensors to utilize it for the force control, the cost of the robot system can be suppressed, and the robot system can be fabricated in a smaller size.

Though the invention was described above by way of representative embodiments, it will be understood that a person skilled in the art may make the above-mentioned modifications, various other modifications, omissions or additions without departing from the scope of the present invention.

The invention claimed is:

1. A robot controller which moves either a tool or a workpiece relative to the other one of them by a hand unit of the robot to control the force acting between said tool and said workpiece, comprising:
   a force detector unit for detecting a force in one axial direction and moments about the axes in two axial directions that are at right angles with said one axis and are, further, at right angles with each other;
   a force-presuming point setting unit for setting a force-presuming point at where a force acting between said tool and said workpiece is presumed; and
   a force-presuming unit for presuming forces in said two axial directions and a moment about said one axis based upon the force in said one axial direction and the moments about the axes in said two axial directions detected by said force detector unit, and upon the position of said force-presuming point set by said force-presuming point setting unit.

2. The robot controller as set forth in claim 1, wherein said force-presuming point setting unit calculates and sets the position of said force-presuming point based upon a relative positional relationship between said tool and said workpiece, upon a position of a reference point for calculating the force-presuming point by which the position of said force-presuming point is calculated, upon a pushing direction between said tool and said workpiece, and upon the data related to the shape of said tool or the shape of said workpiece.

3. The robot controller as set forth in claim 2, wherein the position of said reference point for calculating the force-presuming point by which the position of said force-presuming point is calculated, is variable, and the position of said force-presuming point is calculated and set based upon the varied position of said reference point for calculating the force-presuming point.

4. The robot controller as set forth in claim 1, wherein said force-presuming point setting unit varies the position of said force-presuming point while said robot is in operation.

5. The robot controller as set forth in claim 1, further comprising a force-presuming point correction unit for correcting the position of said force-presuming point by presuming the amount of wear of said tool.

6. The robot controller as set forth in claim 1, wherein said force-presuming point setting unit applies a force to said force-presuming point to calculate and set the position of said force-presuming point based upon the force in said one axial direction and upon the moments about the axes in said two axial directions.

7. The robot controller as set forth in claim 6, wherein said force-presuming point setting unit applies a known force to said force-presuming point to calculate and set the position of said force-presuming point.

8. The robot controller as set forth in claim 6, wherein when the force-presuming point is arranged on any one axis of the three axes, said force-presuming point setting unit calculates and sets the position of said force-presuming point by applying a given force in a known direction which is not in parallel with a plane subtended by the two axes other than the axis in which the force can be measured or, when said force-presuming point is arranged on a plane subtended by the axis in which the force can be measured and the axis which is either one of the rest of the two axes, said force-presuming point setting unit calculates and sets the position of said force-presuming point by applying a given force in a known direction which is not in parallel with the above plane and is not, either, in parallel with a plane subtended by the two axes other than the axis in which the force can be measured.

9. The robot controller as set forth in claim 2, further comprising a unit for setting a reference point for calculating the force-presuming point, which applies a force to said reference point for calculating the force-presuming point to calculate and set the position of said reference point for calculating the force-presuming point based upon the force in said one axial direction and upon the moments about the axes in said two axial directions.

10. The robot controller as set forth in claim 9, wherein said unit for setting a reference point for calculating the force-presuming point applies a known force to said reference point for calculating the force-presuming point to calculate and set the position of said reference point for calculating the force-presuming point.

11. The robot controller as set forth in claim 9, wherein when said reference point for calculating the force-presuming point is arranged on any one axis of the three axes, said unit for setting a reference point for calculating the force-presuming point calculates and sets the position of said reference point for calculating the force-presuming point by applying a given force in a known direction which is not in parallel with a plane subtended by the two axes other than the axis in which the force can be measured or, when the reference point for calculating the force-presuming point is arranged on a plane subtended by the axis in which the force can be measured and the axis which is either one of the rest of the two axes, said unit for setting a reference point for calculating the force-presuming point calculates and sets the position of said reference point for calculating the force-presuming point by applying a given force in a known direction which is not in parallel with the above plane and is not, either, in parallel with a plane subtended by the two axes other than the axis in which the force can be measured.

* * * * *